March 10, 1970  R. H. CONLEY, JR  3,499,586
CONFECTIONERY DISPENSER
Filed April 19, 1968  5 Sheets-Sheet 1
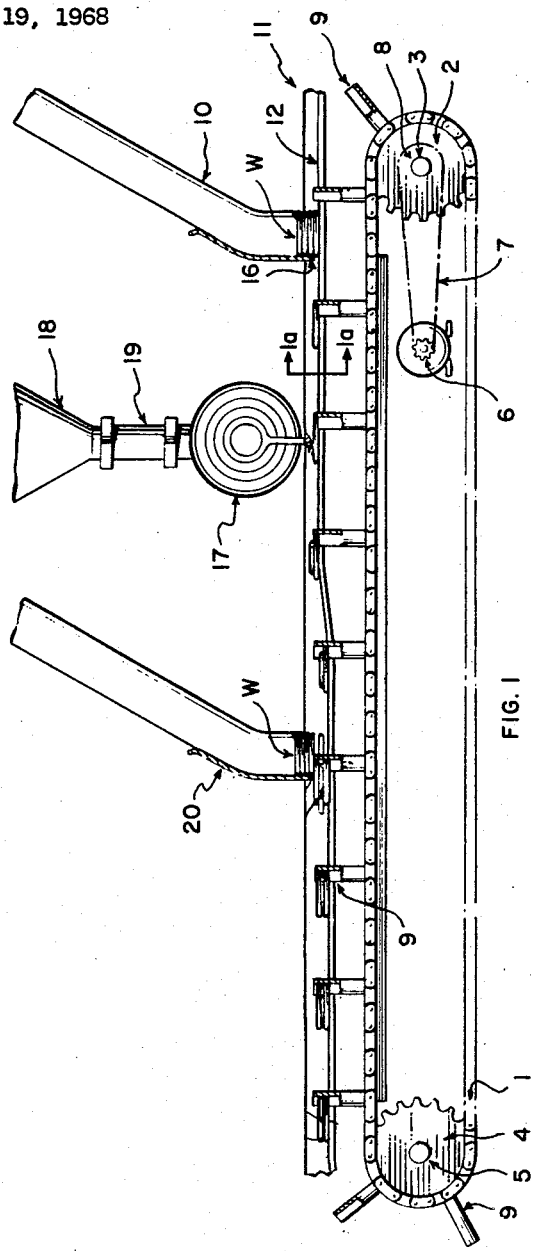
INVENTOR.
RUSSELL H. CONLEY JR.
BY *Walter M. Rodger*
ATTORNEY

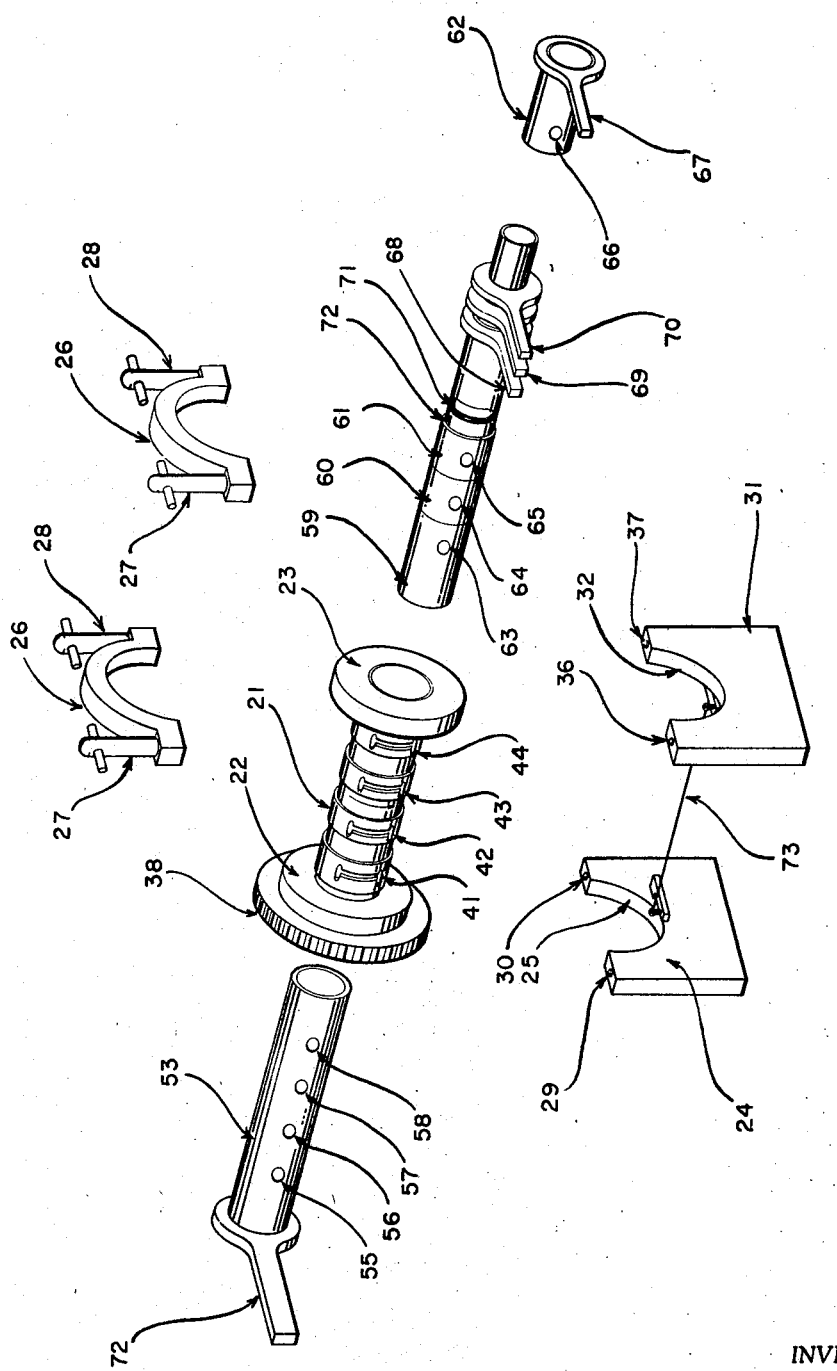

March 10, 1970  R. H. CONLEY, JR  3,499,586
CONFECTIONERY DISPENSER
Filed April 19, 1968  5 Sheets-Sheet 2
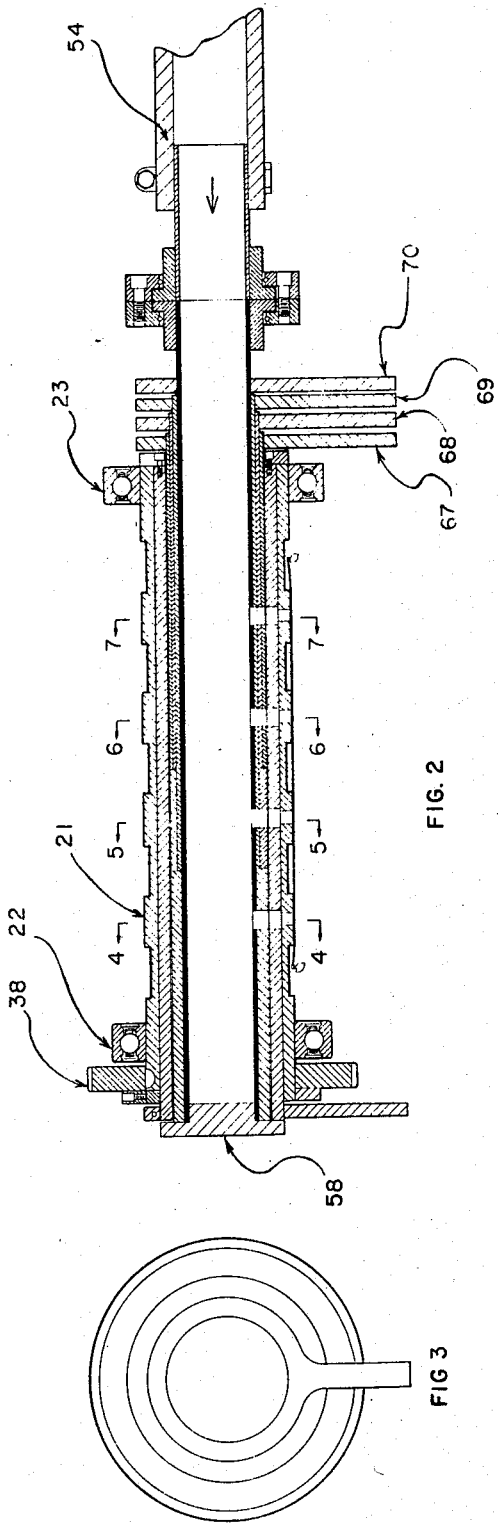
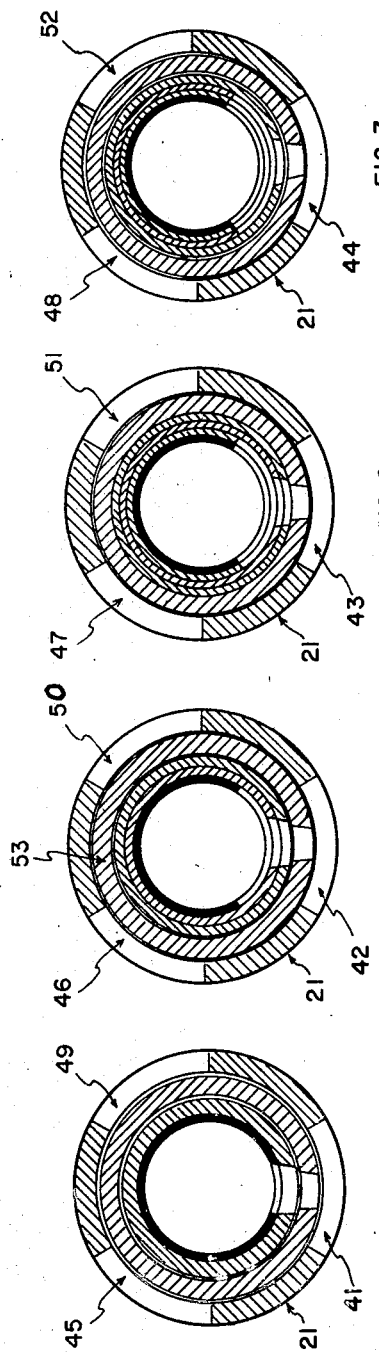
INVENTOR.
RUSSELL H. CONLEY JR.
BY *Walter M. Rodgers*
ATTORNEY March 10, 1970 R. H. CONLEY, JR 3,499,586
CONFECTIONERY DISPENSER Filed April 19, 1968 5 Sheets-Sheet 5

INVENTOR.
RUSSELL H. CONLEY JR.
BY Walter M. Rodgers
ATTORNEY

United States Patent Office 3,499,586
Patented Mar. 10, 1970

3,499,586
CONFECTIONERY DISPENSER
Russell H. Conley, Jr., High Shoals, Ga., assignor, by mesne assignments, of ninety-five percent to Quality Food Machinery, Inc., a corporation of Georgia, and five percent to Clyde A. Minder, trustee
Filed Apr. 19, 1968, Ser. No. 722,761
Int. Cl. B67d 3/00
U.S. Cl. 222—482      5 Claims

ABSTRACT OF THE DISCLOSURE

For depositing a filler substance atop a comestible wafer, a plurality of conveyors are disposed alongside each other and are arranged so as to move in a horizontal plane. Wafers mounted above the conveyors and spaced at intervals therealong are moved in parallel side-by-side relation. A dispenser is disposed above and in transverse relation to the paths of movement of the wafers and is synchronized so as to deposit on each wafer the desired quantity of filler material. The depositor comprises a pair of relatively rotatable depositor elements having apertures corresponding to the number and spacing of conveyors therebelow. As disclosed, each depositor element incorporates three sets of aligned dispensing apertures so that when one depositor element is rotated relative to the other, a deposit of material is made when an aperture in one depositor element comes into registry with an aperture in the other depositor element. Since the material to be deposited is in effect extruded from the depositor elements and since it is introduced into one end of the depositor elements under pressure, variations in the quantity extruded may result so that a control element is provided having adjusting apertures therein whereby the effective cross-sectional area of the dispensing apertures in one depositor element may be varied.

---

A dispenser constructed according to one form of the invention comprises relatively movable depositor elements each having at least one dispensing aperture therein. Relative rotation, for example, of one depositor element relative to the other causes intermittent registry of the dispensing apertures in the depositor elements. A hollow tubular control element having at least one adjusting aperture therein is arranged so as normally to occupy a position of at least partial registry with the dispensing aperture in one of the depositor elements and means are provided for adjusting the position of the control element relative to the depositor elements so as to vary the quantity of material extruded by the dispenser under given pressure conditions within the dispenser and for a given material to be dispensed. Any number of parallel conveyors having wafers thereon may be used in conjunction with the invention because according to a principal feature thereof, the hollow tubular control element is disposed within the depositor elements and hence affords a ready passageway for material introduced into one end of the dispenser assembly and any variations in the quantity extruded through the various dispensing apertures may be adjusted according to a principal feature of the invention by adjusting the control elements relative to the depositor elements.

Figure 9:
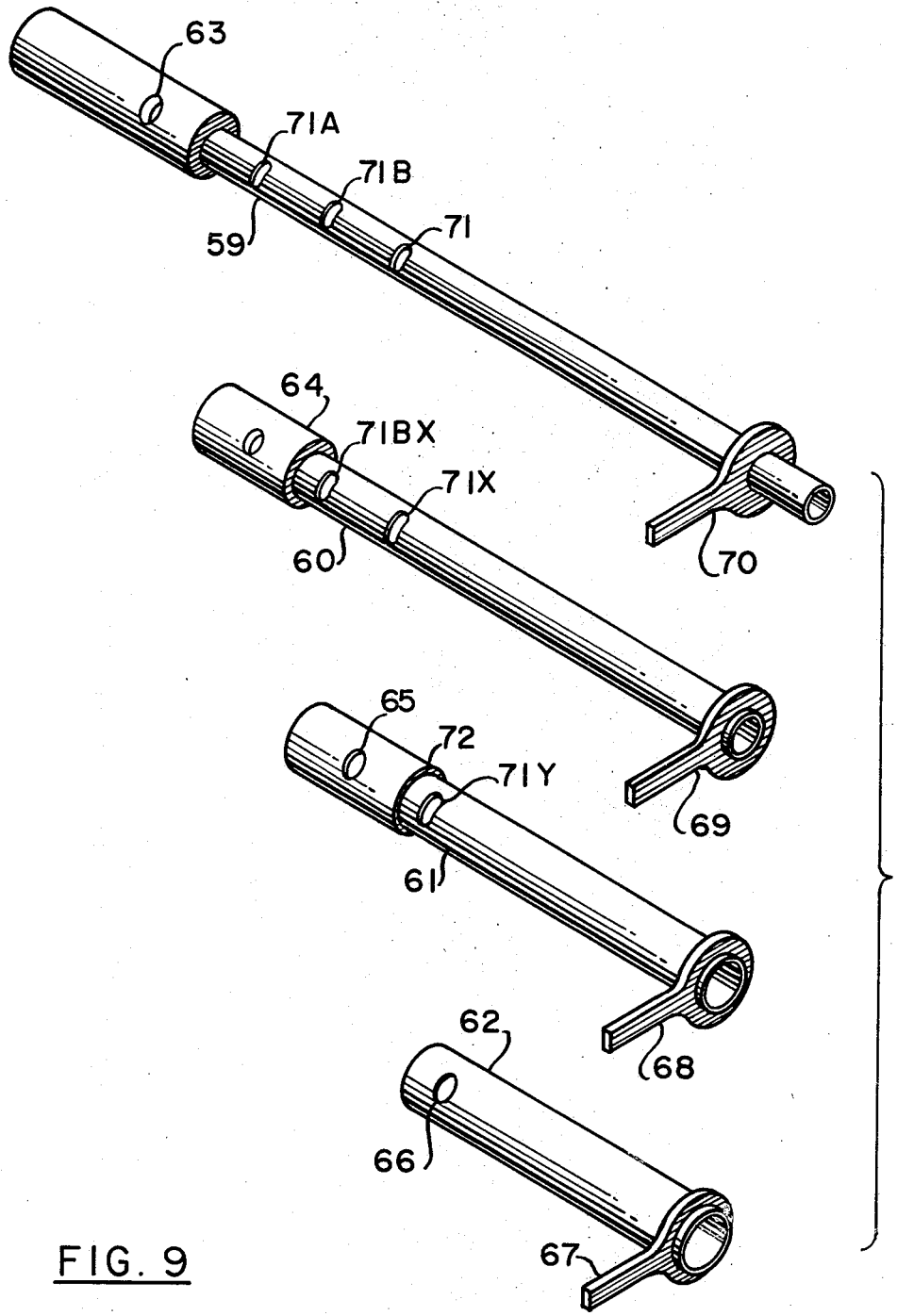
Figure 10:
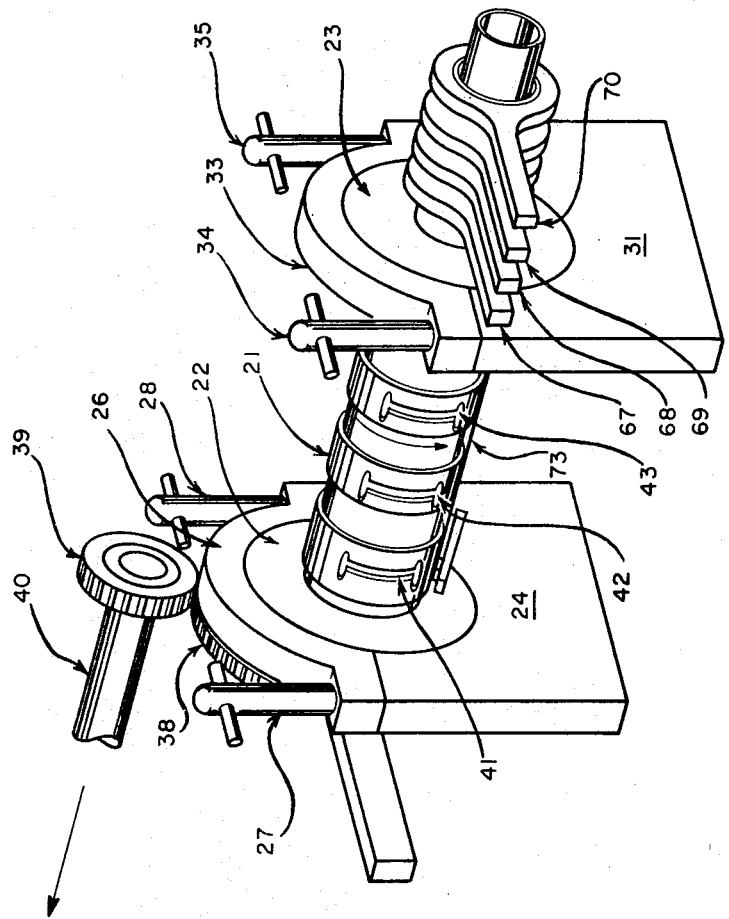

For a better understanding of the invention reference may be had to the following detailed description taken in conjunction with the accompanying drawings in which FIG. 1 is a side view of a dispensing apparatus which embodies the invention; FIG. 1a is a fragmentary enlarged cross-sectional view taken along the line 1a—1a as designated in FIG. 1; FIG. 2 is a cross-sectional view taken in the vertical plane of the dispenser shown above the conveyors of FIG. 1; FIG. 3 is an end view of the dispenser shown in FIG. 2; FIGS. 4–7 inclusive are cross-sectional views along the corresponding sectional lines as designated in FIG. 2; FIG. 8 is an exploded perspective view of the dispenser constructed according to this invention; FIG. 9 is an exploded perspective schematic view of the telescopically related control element and in which FIG. 10 is an assembled perspective view of a dispenser in which the exploded parts of FIG. 8 are combined in an assembled structure.

In the drawings, the numeral 1 designates an endless conveyor chain driven by sprocket 2 which is rotatably mounted on shaft 3. Idler sprocket 4 is rotatably mounted on horizontal shaft 5 and operating motion is imparted to conveyor 1 by any suitable means such as electric motor 6 and driving chain 7 arranged to cooperate with driven sprocket 8 affixed to and rotatable with sprocket 2. A plurality of wafer pusher elements 9 are mounted on conveyor 1. Since FIG. 1 is a side view, only one conveyor 1 is discernable. It will be understood particularly with reference to FIG. 1a that a number of conveyors such as 1 are disposed alongside each other and that each conveyor is provided with a plurality of spaced wafer pusher elements 9 as is apparent from FIG. 1a.

For depositing wafers on the conveyors 1, a chute 10 is provided with a quantity of wafers W and wafer supporting structure generally designated by numeral 11 is provided. As is best shown in FIG. 1a, an angle element 12 is mounted on one side of the paths of movement of the wafers W and a corresponding oppositely disposed angle element 12 is also provided. Three support strips 13, 14 and 15 are disposed alongside each other and between the angles 11 and 12. The pusher elements 9 are arranged to ride in the space between the support strips 13, 14 and 15 and the angles 12 as is apparent in FIG. 1a.

As is well known, the lower edge 16 of chute 10 is spaced above the strips 13 and 15 and the supporting parts of angles 12 and the height of pusher elements 9 is such that these elements barely clear the lower edge 16 of chute 10. Since each wafer is somewhat thinner than the space between supporting elements 12–15 and the lower edge 16 of chute 10, it is obvious that the wafers are individually fed from the bottom of chute 10 in sequence as a pusher engages a particular wafer.

As is well understood in the art, filler substance such as peanut butter, viscous sweetened filler material and the like is deposited on individual wafers W by the dispenser depicted in FIG. 1 and designated generally by the numeral 17. This material to be dispensed is supplied from a hopper 18 under pressure by virtue of conventional pump 19.

If desired, a top wafer may be placed atop each wafer W and its associated filler material. Toward this end, a chute 20 may be provided if desired and a supply of wafers W placed atop each wafer as the operation progresses as is well known in the art. Of course, the top wafer may be omitted entirely if desired, the chute 20 being shown merely for the sake of completeness.

The dispenser 17 is shown in detail in FIGS. 2–10 inclusive and comprises a tubular despositor element designated by the numeral 21 which is rotatably supported by a pair of end bearings 22 and 23 mounted on opposite sides of the conveyor 1. Although there is no direct mechanical connection between conveyor 1 and the dispenser 17, the dispenser is driven in synchronism with the conveyor in the general manner disclosed in United Sates Patents 2,902,948 and 2,941,698. Bearing 22 is supported by a base support 24 and is simply disposed within the arcuate portion 25 thereof, the bearing being secured in position by means of arcuate clamp 26. Clamp 26 is held in position by a pair of manually rotatable screws 27 and 28 which cooperate with threaded apertures 29 and 30 formed in base support 24. In like fashion, bearing 23 is mounted on base support 31 and more particularly in the arcuate portion 32 thereof. Of course bearing 23 is held in position atop support 31 by clamp 33 and associated screws 34 and 35 which cooperate with internally threaded apertures 36 and 37 respectively.

Rotary motion is imparted to depositor element 21 by means of a gear 38 which is securely affixed to the left hand end of depositor element 21 and which is rotated by driving pinion 39 supported on and rotatable with drive shaft 40 which in turn is driven by any suitable prime mover which is synchronized with the motor 6.

As is apparent from the drawings, depositor element 21 is provided with a plurality of dispensing apertures designated in the drawings by the numerals 41-44 inclusive. It will be understood that any number of dispensing apertures such as 41-44 may be provided and of course the cross-sectional configuration of these apertures may be arranged in known manner according to the shape, size and the like of the wafers W. Furthermore, and as best shown in FIGS. 4-7 inclusive, a number of rows of dispensing apertures may be provided. For example, a row of axially spaced horizontally aligned apertures 45-48 may be provided as well as another row of dispensing apertures designated by the numerals 49-52 if desired.

Cooperating with the hollow tubular depositor element 21 is a telescopically related hollow tubular depositor element 53 which is disposed within depositor element 21 so as to accommodate the efficient and easy introduction of material through the hollow tubular conduit 54 which interconnects pump 19 and the right hand end of the depositor as shown for example in FIG. 2.

As is best shown in FIGS. 2 and 8, depositor element 53 is provided with a plurality of dispensing apertures 55-58 inclusive. Thus since depositor element 53 is fixed in position during normal operation of the dispenser, a dispensing action is effected when dispensing apertures such as 41-44 formed in depositor element 21 come into registry with dispensing apertures 55-58 respectively formed in depositor element 53.

As is well known in the art, the left hand end of the dispenser is closed by means of closure element 58 so as to prevent the flow of material from the left end portion of the dispenser.

Since material to be dispensed may be highly viscous and since it is forced to flow under pressure from the conduit 54 toward the left as viewed for example in FIG. 2, it is possible that the quantity of material extruded through the dispensing apertures may vary in an undesired fashion so that the amount of material deposited, for example, on the wafers in one row may be substantially different from the amount deposited in the wafers in another row causing undesired variations in the quality and uniformity of the finished product.

In accordance with this invention, uniform quality is assured by controlling the effective cross-sectional area of the dispensing apertures 55-58. More specifically, a plurality of hollow tubular control elements 59-62 are telescopically related with each other and are arranged to be dispensed inside the hollow tubular depositor element 53 and are provided with adjusting apertures 63-66 respectively which occupy positions of partial or complete registry with the dispensing apertures 55-58 formed in despositor element 53. The hollow tubular control elements 59-62 may be rotated relative to each other and to despositor element 53 by manually operable radially extending operating arms 67-70 inclusive. Of course, each operating arm 67-70 is securely affixed to its associated tubular control element 62-59 respectively. Thus if the effective area of dispensing aperture 55 is to be varied, radial operating arm 70 is moved angularly in one direction or the other to rotate control element 59 and to shift adjusting aperture 63 relative to dispensing aperture 55 so as to vary the effective cross-sectional area of dispensing aperture 55. Each dispensing aperture 56, 57 and 58 may also be correspondingly adjusted by simply operating the radial operating arms 69, 68 and 67 as may be desired and in this manner to shift adjusting apertures 64, 65 and 66 relative to dispensing apertures 56, 57 and 58 respectively.

Since hollow tubular control elements 59-62 are telescopically related to each other, means must be provided for preventing one control element such for example as 59 from interfering with the effective control of the adjusting apertures such as 64, 65 and 66 in control elements 60, 61, 62 respectively. Thus an enlarged clearance aperture such as 71 is provided in control element 59 in the region of dispensing aperture 58 and adjusting aperture 66 formed in depositor element 53 and in control element 62 respectively. Thus adjustment of control element 59 by virtue of angular movement of its control arm 70 does not in any way interfere with the respective cross-sectional area of apertures 58 and 66 because the size of the clearance aperture 71 is so great that any operating position of control element 59 and of control arm 70 does not effect any reduction in the effective cross-sectional area of dispensing apertures 58 and of adjusting aperture 66. In like fashion, similar clearance apertures such as 71A are formed in control element 59 in the general region of dispensing apertures 56 and of adjusting aperture 64 and a similar enlarged clearance aperture 71B is formed in control element 59 in the region of dispensing aperture 57 and of adjusting aperture 65. Thus any adjustment of control element 59 is ineffective to impart any change in the effective cross-sectional areas of any of the dispensing apertures such as 56-58 formed in depositor element 53 or in adjusting apertures 64-66 formed in control elements 60-62 respectively.

In like fashion, control element 60 is provided with a large clearance aperture 71BX which registers with apertures 65 and 57 and another clearance aperture 71X which registers with the apertures 66 and 58. Furthermore, control element 61 is provided with a clearance aperture 71Y which is generally similar to clearance aperture 71 and which coincides generally with apertures 58 and 66 formed in depositor element 53 and in control element 62.

From the above description it is apparent that by the invention any number of aligned rows of dispensing apertures such for example as 55-58 and 41-44 formed in the depositor elements 53 and 21 respectively may be utilized due primarily to the hollow configuration of the control elements 59-62 and to the clearance apertures such as 71 which effectively render the device readily adjustable for any pressure condition within conduit 54 and inside the dispenser and for any viscosity condition of the material to be dispensed within wide limits.

Since the control elements such as 59-62 are telescopically related and since the adjusting apertures such as 63, 66 must fit snugly inside the depositor element 53, it is necessary to provide shoulders such as that best shown in FIGS. 8 and 9 and designated by the numeral 72 as will be readily understood. Stated otherwise, the shoulder such as 72 formed in control element 61 must reduce the outside diameter of the portion of control element 61 in which the adjusting aperture 65 is formed to a lesser dimension so that the inner diameter of the adjacent outer control element 62 will fit snugly about the adjacent exterior surface of control element 61.

In order to prevent undesired flow of filler material from the dispenser when the mechanism is shut down, the depositor element 53 is arranged so as to be rotated through a predetermined angle of rotation sufficient to cause the dispensing apertures such as 55 and 58 to move out of alignment with the dispensing apertures such as 41–44 formed in depositor element 21. Of course the angle of movement of depositor element 53 is slightly greater than the angle defined by the peripheral spacing of the dispensing apertures such as 41–44 from the dispensing apertures 45–48 and 49–52, so that no matter what relative position the depositor element 21 might occupy when stopped relative to depositor element 53, the dispensing apertures in these elements would not be in alignment. By this means undesired extrusion of material from within the dispenser is prevented. Operation of depositor element 53 as a cut-off device is by means of the operating arm 72 which preferably is rotated to the desired angle by suitable automatic means responsive to a shutting down operation. Such means for example could take the form of a fluid motor.

Preferably a cut-off wire 73 is used to scrape the outer surface of depositor 21.

The embodiments of the invention in which an exclusive property or privilege is claimed are defined as follows:

1. A dispenser comprising a pair of hollow tubular telescopically related depositor elements each having a plurality of dispensing apertures therein, each dispensing aperture in one depositor element being associated with a corresponding dispensing aperture in the other of said depositor elements and the dispensing apertures in each depositor element being spaced axially from each other, means for imparting relative movement to said tubular elements so as to cause the apertures therein to occupy positions of registry at periodic intervals, a hollow control element having an adjusting aperture associated with each dispensing aperture of one of said depositor elements, each of said control elements being adjustable relative to said one depositor element and being normally movable relative to the other control elements so as to vary the degree of registry between the adjusting aperture therein and is associated dispensing aperture in said one depositor element, and means for adjusting the position of each of said control elements relative to said one depositor element.

2. A dispenser according to claim 1 wherein said control elements are telescopically related with each other.

3. A dispenser according to claim 2 wherein one of said control elements is provided with an enlarged clearance aperture which is in full registry with an adjusting aperture in an adjacent cooperating control element for all relative operating positions of said control elements.

4. A dispenser according to claim 2 wherein said control elements are disposed inside said depositor elements.

5. A dispenser according to claim 4 wherein each inner control element which is disposed inside another control element is provided with one adjusting aperture and with a separate clearance aperture for the adjusting aperture of each control element which is disposed outside such inner control element.

References Cited

UNITED STATES PATENTS

| | | | |
|---|---|---|---|
| 1,163,734 | 12/1915 | Binns | 239—538 |
| 1,174,897 | 3/1916 | Preston | 239—538 |
| 2,827,928 | 3/1958 | Guckel | 222—553 X |
| 2,907,500 | 10/1959 | Kerkvliet | 222—311 |
| 3,152,732 | 10/1964 | Schulman et al. | 222—311 X |

ROBERT B. REEVES, Primary Examiner

NORMAN L. STACK, JR., Assistant Examiner

U.S. Cl. X.R.

222—553